(12) United States Patent
Knight

(10) Patent No.: US 7,481,408 B1
(45) Date of Patent: Jan. 27, 2009

(54) ADJUSTABLE TELESCOPING SUPPORT BAR FOR RAISING AND/OR HOLDING AN OBJECT IN AN ELEVATED POSITION

(76) Inventor: Stephen R. Knight, 7861 Amanda Cir., Anaheim, CA (US) 92807

( * ) Notice: Subject to any disclaimer, the term of this patent is extended or adjusted under 35 U.S.C. 154(b) by 0 days.

(21) Appl. No.: 11/999,562

(22) Filed: Dec. 6, 2007

(51) Int. Cl.
*A47F 5/00* (2006.01)

(52) U.S. Cl. .............. 248/354.1; 248/188.5; 248/200.1; 248/354.6

(58) Field of Classification Search ................ 248/351, 248/357, 354.1, 354.4, 354.5, 354.6, 200.1, 248/188.5; 292/306, 338
See application file for complete search history.

(56) References Cited

U.S. PATENT DOCUMENTS

| | | | |
|---|---|---|---|
| 1,261,755 A | 4/1918 | Beyle | |
| 1,278,100 A | 9/1918 | Bruning | |
| 1,591,110 A | 7/1926 | Wilson | |
| 1,768,425 A | 6/1930 | Smith | |
| 2,098,146 A | 11/1937 | Hunt | |
| 2,222,078 A | 11/1940 | Kroeger et al. | |
| 2,468,484 A | 4/1949 | Clark | |
| 3,229,940 A | 1/1966 | Kagels | |
| 4,676,536 A | 6/1987 | Arbic et al. | |
| 4,695,028 A | 9/1987 | Hunter | |
| 5,137,235 A | 8/1992 | Wentworth et al. | |
| 6,347,777 B1 * | 2/2002 | Webber et al. | ........... 248/354.1 |
| 6,551,226 B1 | 4/2003 | Webber et al. | |
| 7,097,380 B2 | 8/2006 | Lee | |
| 7,284,738 B1 * | 10/2007 | Staneart | .................... 248/354.1 |
| 7,390,147 B2 * | 6/2008 | Stankus et al. | .............. 405/288 |
| 2006/0062632 A1 | 3/2006 | Jang | |
| 2006/0186284 A1 * | 8/2006 | Root | .......................... 248/161 |
| 2008/0116333 A1 * | 5/2008 | Chang | ..................... 248/200.1 |

* cited by examiner

Primary Examiner—Ramon O Ramirez (57) ABSTRACT

An adjustable support bar for raising/holding an object, such as a vehicle hood, in an elevated position to provide access to a fire under the hood includes a telescoping inner and outer tube assembly. The inner tube is provided with a series of longitudinally aligned spaced holes. A collar is slidably positioned over the outer tube with an elongated channel-shaped extension rod secured at one end to the collar and at the other end to the upper end of the inner tube. The extension rod, except for it's ends, is spaced from the outer (and inner) tube, except for the ends thereof, to accommodate a user's hand for raising the top of the inner tube to a desired height. A latching lever mounted on the outer tube selectively engages one of the holes in the inner tube to lock the tubes together when the desired height has been reached.

17 Claims, 10 Drawing Sheets

ADJUSTABLE TELESCOPING SUPPORT BAR FOR RAISING AND/OR HOLDING AN OBJECT IN AN ELEVATED POSITION

FIELD OF THE INVENTION

The present invention relates to a device for supporting an object in an elevated position and more particularly to a manually adjustable bar designed primarily for use by personnel engaged in fighting fires to support motor vehicle hoods, garage doors, etc. in an elevation position.

BACKGROUND OF THE INVENTION

Fire fighting personnel are frequently involved in suppressing a fire in the engine compartment of a motor vehicle. To reach the source of the fire it is necessary to raise and then maintain the hood of the vehicle in a raised position so that water or other fire suppressing material may be directed into the engine compartment. The heat typically present in an engine compartment fire will frequently disable any spring designed to maintain the hood in the raised position. It has been my experience that once the hood falls it is next to impossible to reach, release the catch and re-raise the hood. By the same token manipulating a hinged hood supporting rod, present in some vehicles, may be dangerous or impossible because of the heat in the compartment.

To insure that a vehicle hood, once raised, remains elevated it has been customary for one fighting an engine compartment fire to procure an axe from the fire engine and prop it between the hood and an underlying part of the vehicle frame structure. This procedure however poses some risk since one or both hands must be at least momentarily exposed to the compartment heat.

There is a need for a device which will effectively support a vehicle hood at a desired height or elevation which is immune to the engine compartment heat and can be manipulated with one hand outside of the engine compartment.

In addition, there is a need for a simple and relatively inexpensive device to support other structures in a selected elevated position during the course of fighting a fire in a building.

One such need involves supporting a garage door. It not unusual for those involved in extinguishing a fire in a residential dwelling to enter the dwelling through the garage. To do so the garage door, whether of the swinging or roll-up door type, must be opened. A change in the fire's direction may force the fire crew to exit the premises in a hurry, normally via their entry point, i.e., the garage. This exit will no longer be available if heat of the fire has disabled the springs allowing the door(s) to close thus trapping the fire fighters.

This phenomenon is not hypothetical. More than one casualty based on this unfortunate chain of events has been noted by The National Institute for Occupational Safety and Health.

Various types of adjustable length devices for supporting objects, such as tents, construction materials, etc., in elevated positions are known in the art. For example, adjustable length telescoping members in which a pin, pivotally mounted on or slidably positioned in an outer tube, engages a selected hole on an inner tube to adjust the height of the top of the inner tube are known. See, for example, U.S. Pat. Nos. 2,468,484; 7,097,380; 1,591,110; 2,222,018; 3,229,940; 2006/0062632; 6,347,777; and 6,551,226. However, none of these devices are designed to overcome the above problems faced by fire fighting crews. For example, to use such a telescoping tube arrangement to raise a vehicle hood one would have to insert the top of the inner tube under the hood then grasp the inner tube, probably repeatedly, to raise it within the outer tube to achieve the desired height. The tubes would then have to be locked through the use of a pin, for example, together. This procedure would not only be time consuming, but would expose at least one and probably both of the user's hands to the compartment heat and perhaps fire.

There is a need for a simple adjustable height telescopic support bar which eliminates the need for a user to manually grasp the inner member to adjust the height and in particular for such a device that can be rapidly operated with one hand located outside of the compartment.

SUMMARY OF THE INVENTION

An adjustable support bar for holding an object, such as a vehicle engine compartment hood in an elevated position, in accordance with the present invention, includes an inner tube telescopically positioned within an outer tube with the tubes having approximately the same length and aligned along an imaginary longitudinal axis. A collar is slidably positioned over the outer tube which, in the stored position of the support bar, would be located adjacent the lower end or base of the outer tube.

A channel-shaped hand-engaging extension rod is connected at one end to the collar and at the other end to the upper end to the inner tube. The rod, except for its ends, joined to the tubes, is spaced laterally outwardly from the tubes to enable a user to grasp the rod with one hand and extend the length or height of the support bar by sliding the inner tube relative to the outer tube along the longitudinal axis. Means for releaseably locking the inner tube to the lower tube, once a desired height or elevation is achieved, includes an elevation adjusting latch lever having a central section pivotally mounted on the upper end of the outer tube with a forwardly extending distal section forming a 90° angle and terminating in a latching tongue. The distal section of the latch lever is biased toward the inner tube so that the latching tongue will extend into one of a series of longitudinally aligned holes in the inner tube. A hand engaging rearwardly extending proximal section (sometimes referred to as the handle) enables a user to manually retract the latching tongue from a hole to allow the support bar to be collapsed into its stored position with the latching tongue inserted into or positioned slightly above the uppermost hole in the inner tube.

Preferably the support bar, in its stored position, is arranged so that the latching tongue is positioned above the uppermost hole in the inner tube with its face oriented at an acute angle $\theta$ of about 3° to 5° to the longitudinal axis. This position sometimes referred to herein as the "cocked position" allows a user, such as a fireman, after orienting the support bar in a general vertical direction with the base on the ground, to grasp the rod with one hand and rapidly extend the inner tube with the latching tongue face being deflected outwardly as it contacts the lower edge of each hole until the rapid movement ceases. At that time the tongue will seat into an adjacent hole in the inner tube to lock the tubes together.

Optionally, the holes in the inner tube may be countersunk to provide a beveled surface for engaging and deflecting the latching tongue face. The countersink option may be in addition to or in place of providing an acute face angle on the latching tongue face. The tubes and extension rod are made of a high strength heat resistant material, such as stainless steel, and are preferably square in cross-section.

The construction and operation of my adjustable support bar may be best understood by reference to the following description taken in conjunction with the appended drawings.

DESCRIPTION OF THE PREFERRED EMBODIMENT

Referring now to the figures and more particularly to FIGS. 1-11, the adjustable height support bar 10 in the form of a telescoping tube assembly of the present invention includes an inner tube 12 telescopically positioned within an outer tube 14 with the two tubes being aligned along an imaginary longitudinal axis x-x. The inner tube is provided with a series of spaced registration holes or openings 12a along front side 12b, parallel to the axis x-x as shown. See FIG. 3. The holes in cooperation with a latching lever, to be described, releasably lock the tubes together once the upper end of the inner tube has been extended to a desired elevation.

Figure 1:
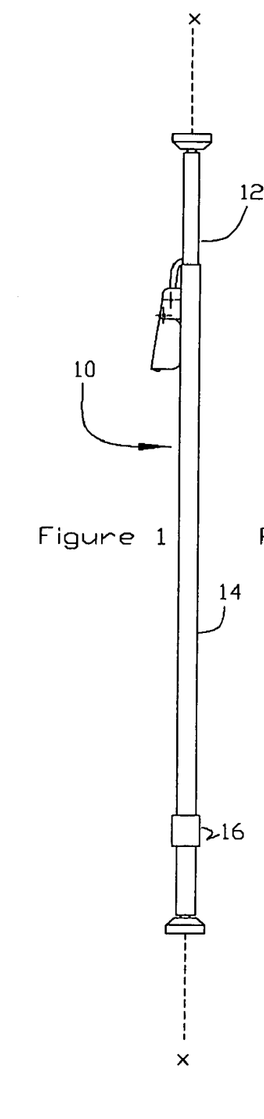
FIG. 1 is a side elevational view of an adjustable support bar in a stored position, in accordance with the present invention.
Figures 2, 3:
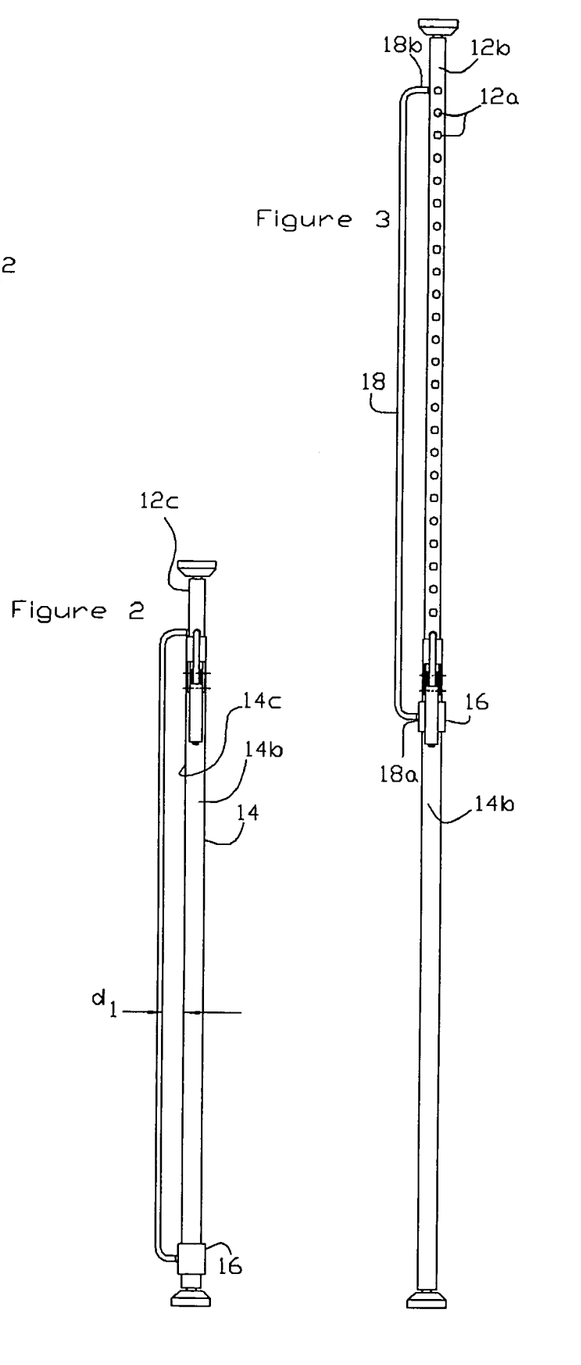
FIG. 2 is a front elevational view of the support bar of FIG. 1, in a partially extended position.
FIG. 3 is a front elevational view of the support bar of FIG. 1 in a fully extended position showing the latching tongue inserted into one of the holes in the inner tube locking the tubes together.

A collar 16 is slidably positioned over the outer tube and located adjacent the lower end of the tube when the support bar is in its stored position as is illustrated in FIG. 2. See the cross-sectional and bottom views of the collar in FIGS. 7a and 7b, respectively. An elongated channel-shaped hand engaging extension rod 18 is secured, e.g., by a weld, at its bottom end 18a to the collar 16 and secured at its top end 18b, e.g., again by welding, to the upper end of the inner tube so that the rod, except for the top and bottom ends, extends laterally outwardly from the exterior surface of side 14c of the outer tube (and side 12c of the inner tube) as shown in FIGS. 2 and 3. This clearance d1 is sufficient to accommodate a user's hand, allowing the user to freely slide the inner tube upwardly, relative to the outer tube. I have found that d1 within the range of about 1" to 5" and preferably about 1¼" to 3" and most preferably about 1⅜" serves this purpose while conserving storage space for the adjustable bar. The sides 14c and 12c are preferably located at a right angle or adjacent to the side 12b containing the registration holes.

Figure 4:
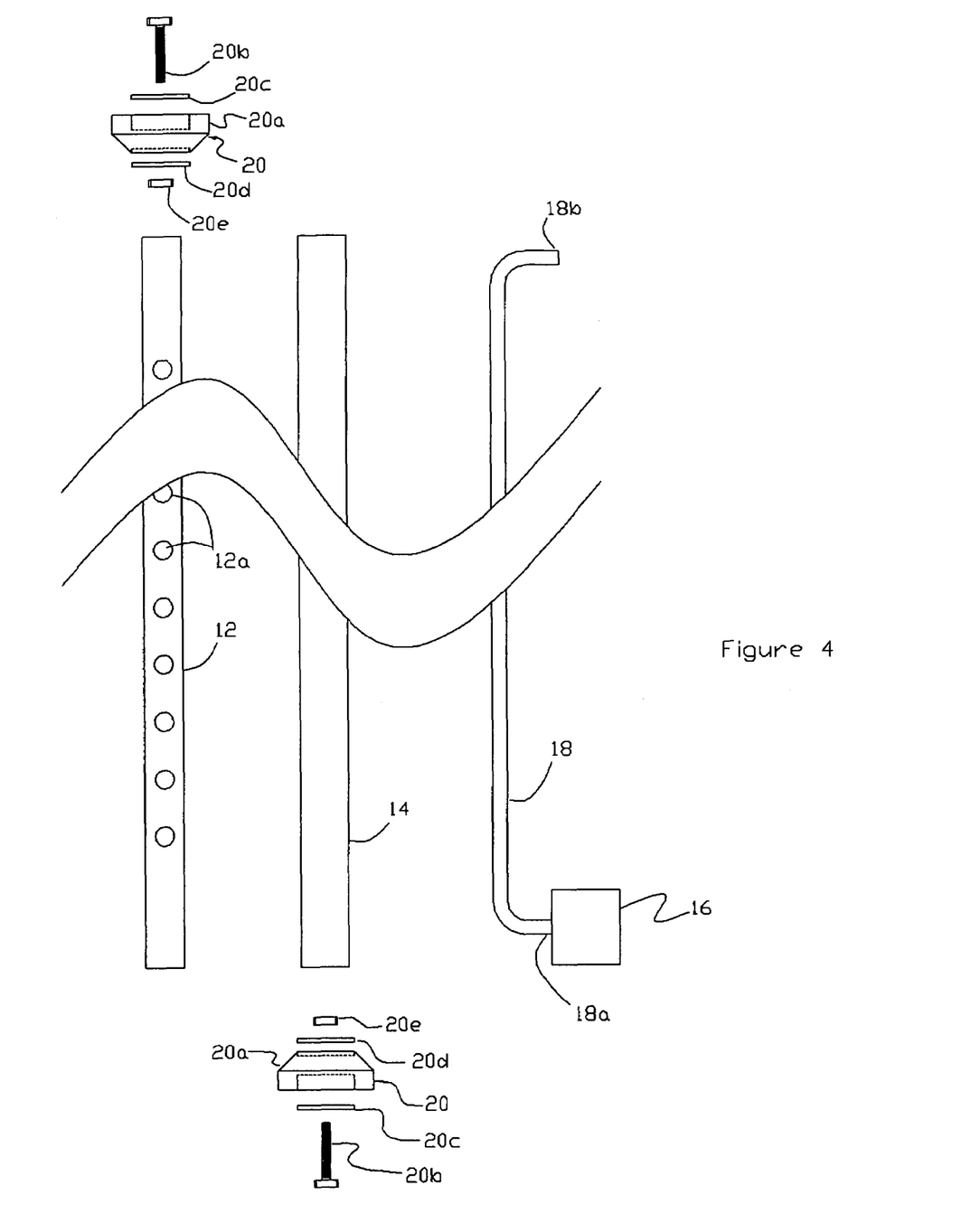
FIG. 4 is a front view, partially broken away, of the support bar of FIG. 1 in an unassembled condition, without the latching mechanism.
Figures 5A, 5B:
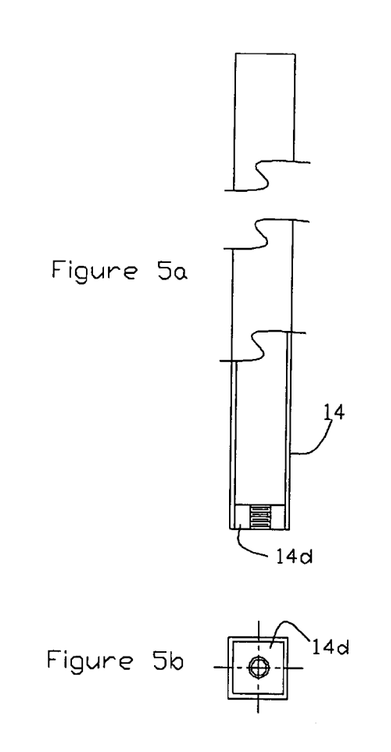
FIGS. 5a and 5b are cross-sectional (partially broken away) and bottom views of the lower end of the outer tube, respectively, showing a threaded end price for receiving the base mount.
Figures 6A, 6B:
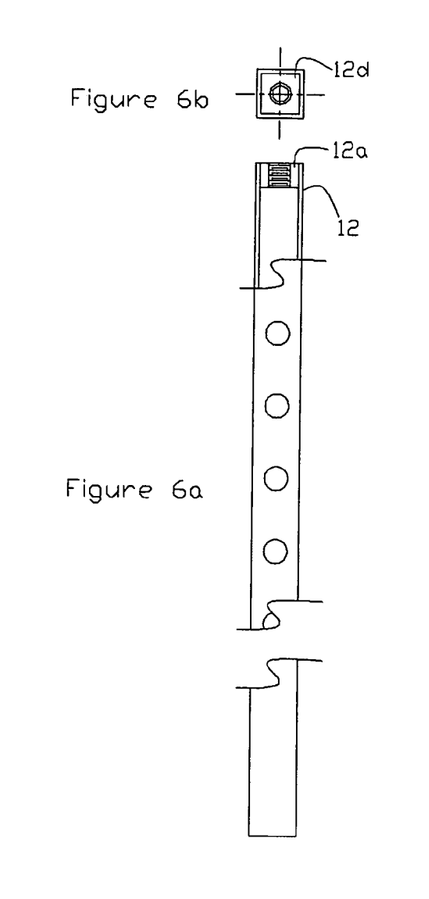
FIGS. 6a and 6b are cross-sectional (partially broken away) and top views of the upper end of the inner tube, respectively, showing a threaded end piece for receiving the top mount.
Figure 7A:
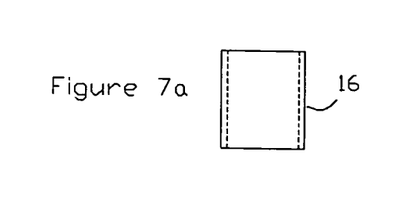
FIGS. 7a and 7b are side and bottom views of the collar, respectively.
Figure 7B:
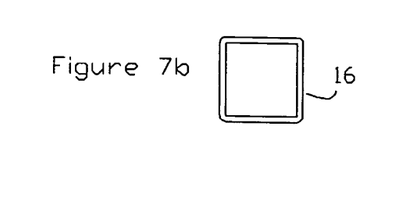
Figures 8A, 8B, 9, 10A, 10B:
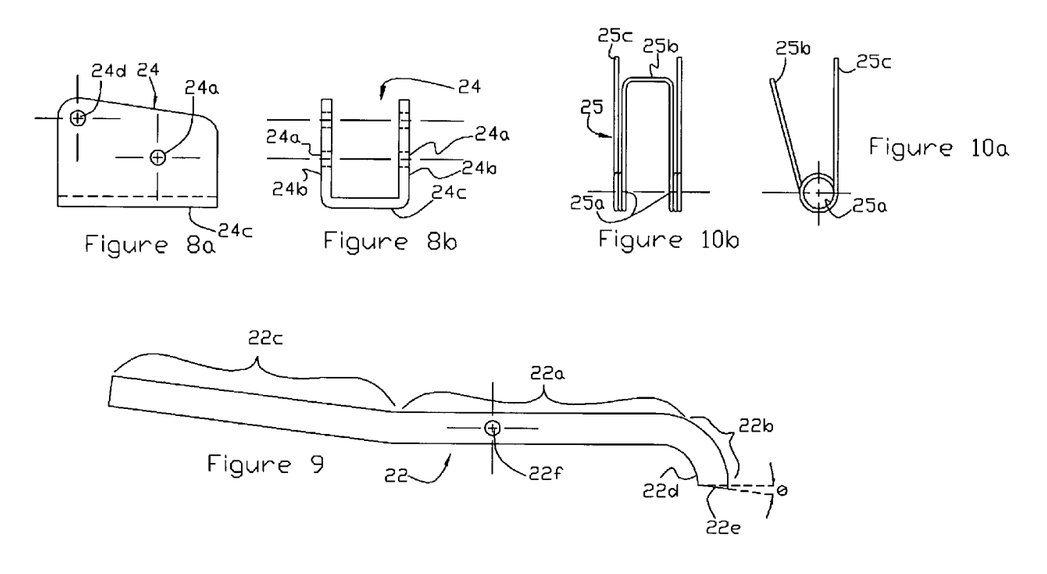
FIGS. 8a and 8b are side and end views of a bracket for pivotally mounting the latch lever to the outer tube.
FIG. 9 is a side view of the latch lever.
FIGS. 10a and 10b are side and end views respectively of a spring for biasing the latching tongue against the inner tube.
Figure 11A:
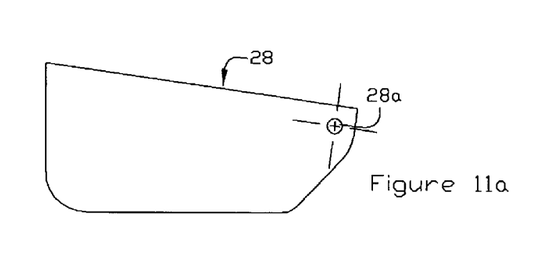
FIGS. 11a and 11b are side and end views, respectively, of a latch housing or cover for protecting the lever from being accidentally moved to unlock the tubes.
Figure 11B:
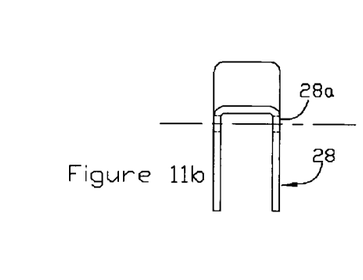

Referring now to FIGS. 4-6 a pair of identical vibration absorbing end caps 20 are secured to each end of the adjustable bar. The lower cap, sometimes referred to as the base, includes a cylindrical vibration absorbing rubber mount 20a which is secured to an internally threaded end piece 14d (FIGS. 5a and 5b), seated in the bottom end of the outer tube, via a threaded (adjustable) elevator bolt 20b and washers 20c-e as is illustrated in FIG. 4. As identical plate 20 is secured to a threaded end piece 12d in the top of the inner tube 12.

The tubes 12 and 14 and collar 16 are made of a rigid high strength heat resistant material such as stainless steel and are preferably square in cross-section to maintain a latching mechanism (to be described) mounted on the outer tube to remain in registry with the holes in the inner tube. I have found that 1", 1¼", and 1½" square tubing for the inner and outer tubes and collar, respectively, provides sufficient internal clearance to allow the inner tube and collar to slide freely relative to the outer tube. A wall thickness of about 0.090" provides the necessary strength where steel is used.

Figure 12:
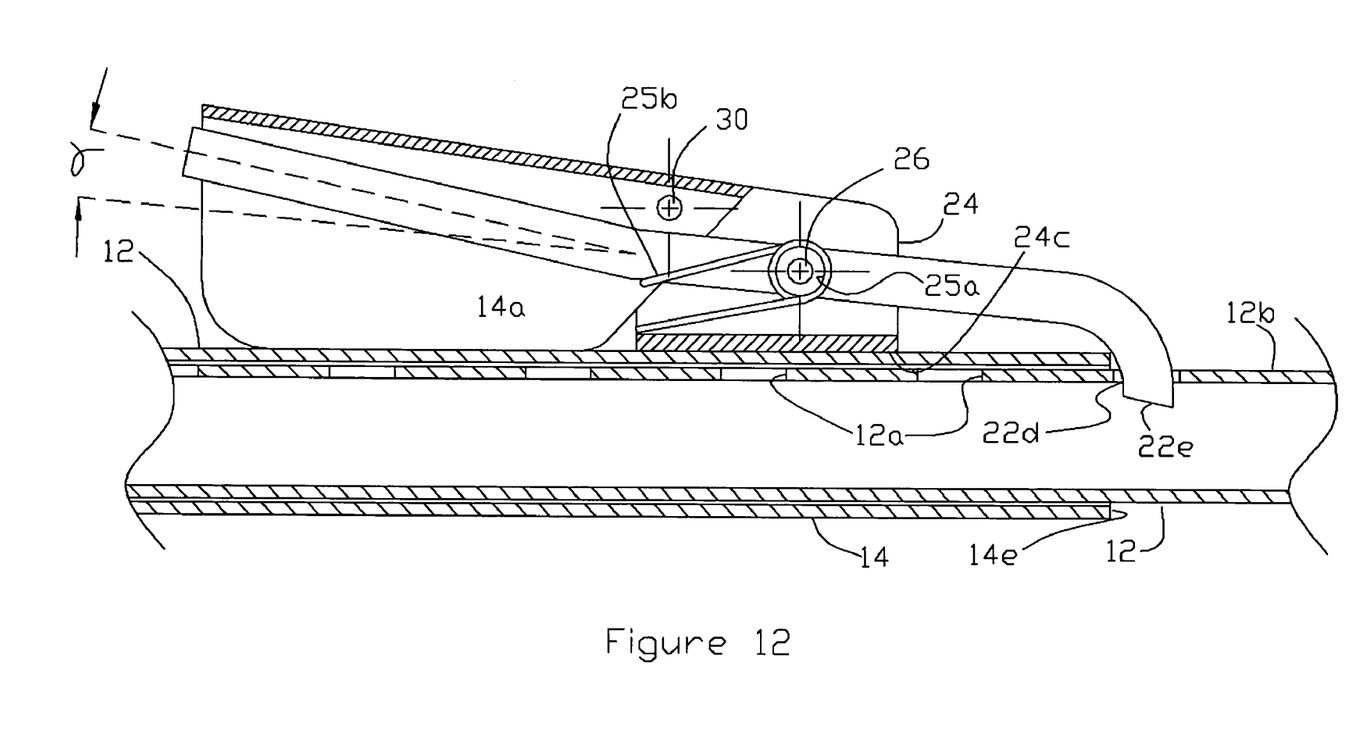
FIG. 12 is a side view of the latching lever and telescoped tubes, broken away and partially in cross-section, with the latch lever and a latch housing mounted on the outer tube and the latching tongue extending through one of the holes in the inner tube showing the orientation of the tongue face and the lever travel limit provided by the rim of the outer tube.

Referring now to FIGS. 8-12, the means for releasably locking the tubes together includes a latch lever 22 having a central section 22a, a distal section 22b terminating in a latching tongue 22d with an end face 22e, and a hand engaging proximal section in the form of a handle 22c extending at an acute angle γ of about 15° ro 25° to the longitudinal axis of the support bar when mounted on the outer tube. See FIG. 12. This angle γ allows the handle 22c to be manually depressed toward the outer tube (overcoming the bias of spring 25) to release the latching tongue from one of the holes in the inner tube as will be explained. The latching tongue end face 22e is formed at an acute angle θ to the longitudinal axis of about 3° to 15° and most preferably at about 8° to 10° to allow the bottom of the holes 12a to deflect the latching tongue outwardly against the spring 25 as the inner tube is rapidly advanced upwardly relative to the outer tube. See FIG. 15. The central section is pivotally mounted to the outer tube via a pin 26 (FIG. 12) extending through hole 22f and secured at each end in aperatures 24a in opposing sides 24b of an inverted channel-shaped lever mounting bracket 24 with the bottom 24c of the bracket being secured, e.g., by welding, to the side 14a of the outer tube, adjacent with the upper end of the outer tube as is illustrated in FIG. 12.

The spring 25 (FIGS. 10a and 10b) includes a central opening 25a surrounding the pin 26 with one leg 25b abutting the underside of the lever's central section and the other leg 25c abutting the bottom 24c of the bracket 24 to bias the latching tongue face 22e toward the side 12b of the inner tube. See FIG. 12.

A channel-shaped lock protective housing 28 is pivotally mounted to the bracket 24 via a pin 30, extending through housing apertures 28a and bracket apertures 24d so that when the support bar 10 is oriented in a vertical direction, as shown in FIG. 12, the housing pivots by force of gravity to enclose the proximal section of the latch lever. In this position the latch lever is protected from an accidental bumping against the side of the support bar by a fireman's backpack. In this position the housing sets partially within the sides 24a of the lever securing bracket 24. The housing 28 may be manually rotated out of the way to provide access to the hand engaging section of the latch lever.

FIG. 12 illustrates the latching tongue 22d inserted into the upper most hole in the inner tube with the peripheral edge 14e of the outer tube abutting the underside of the latching tongue 22 to limit the forward movement thereof. This forward stop action enables a user to readily remove the latching tongue from the hole and unlock the tubes by lifting the cover 28 out of the way and depressing the handle 22c as is illustrated in FIG. 13.

Figure 13:
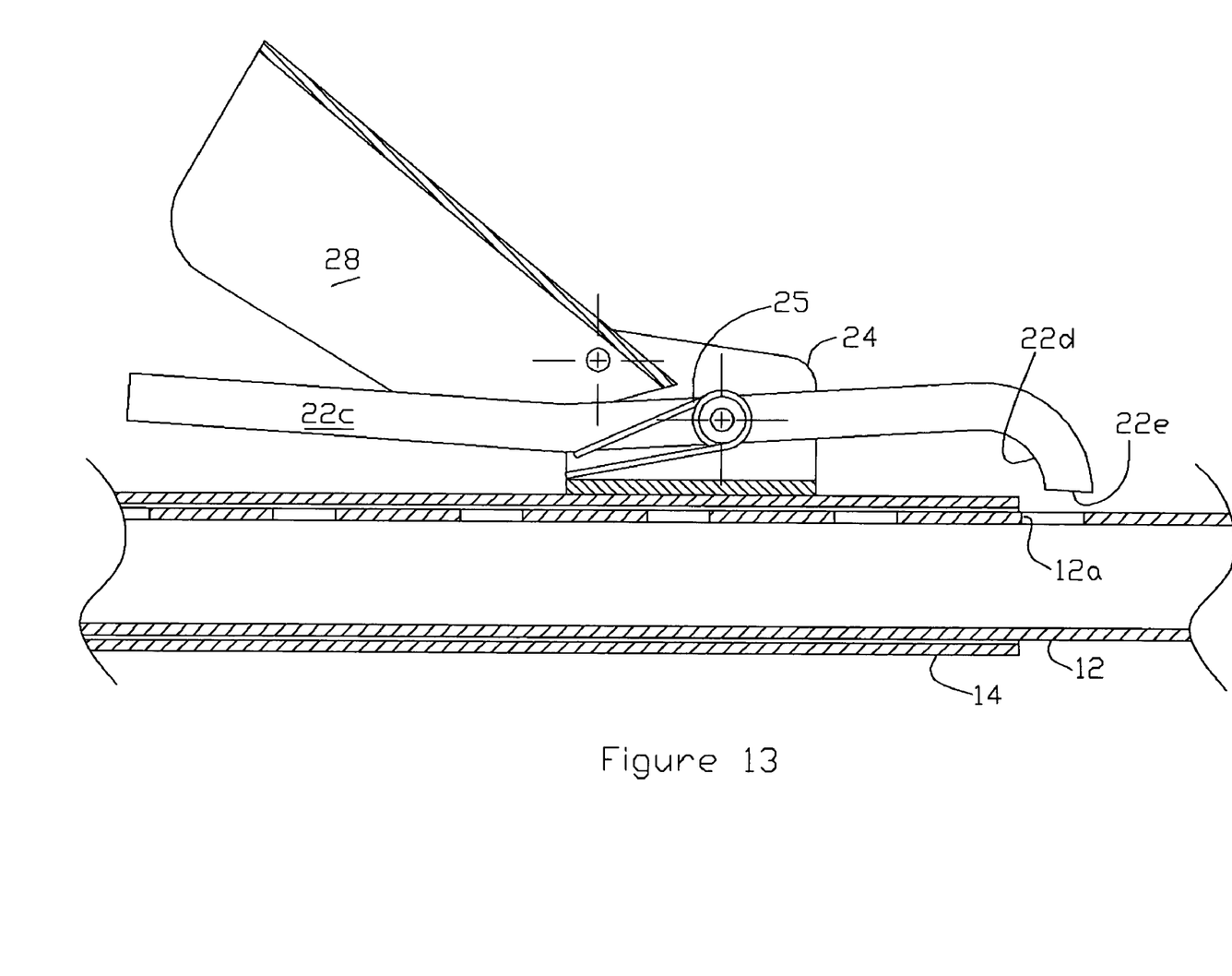
FIG. 13 is a side view of the arrangement of FIG. 12 with the latch housing raised and the handle of the latch lever depressed to raise the latching tongue out of the upper most hole in the inner tube.
Figure 14:
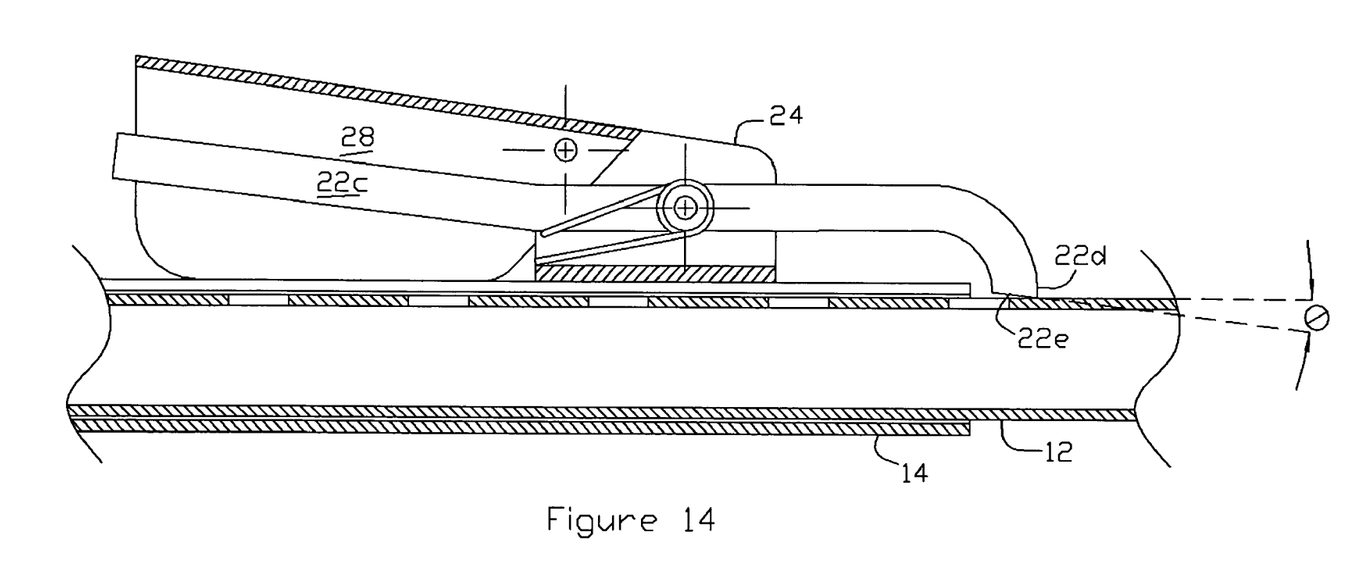
FIG. 14 is a side view of the arrangement of FIG. 12 with the inner tube lowered so that the latching tongue face is resting on the side of the inner tube above the upper most hole, i.e., in the cocked position.

Following the action depicted in FIG. 13, the inner tube may be retracted until the face 22e of the latching tongue is above the upper most hole in the inner tube and the handle 22c, then released as is shown in FIG. 14. FIG. 14 represents the inner tube placed in its cocked position.

Figure 15:
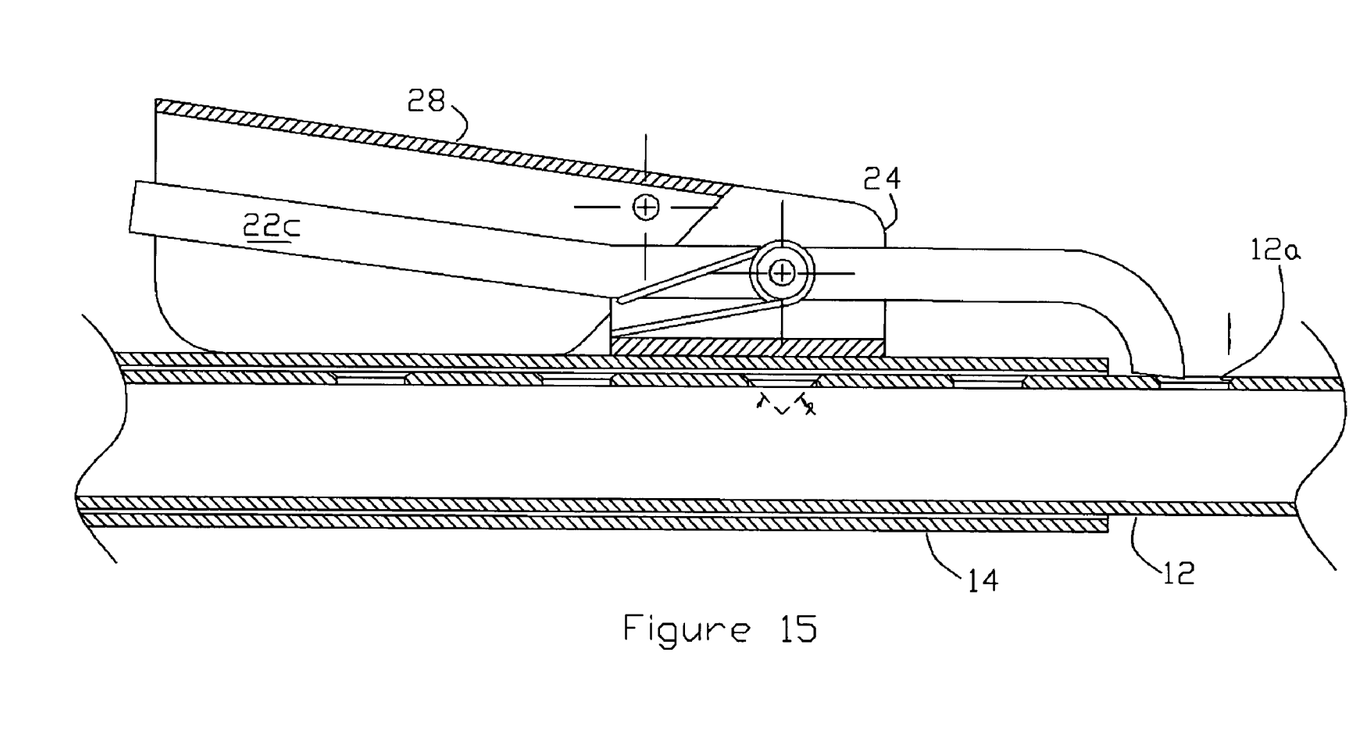
FIG. 15 is a side view of the arrangement of FIG. 12 showing how the latching tongue is deflected outwardly by the bottom rim of one of the holes in the inner tube as the inner tube is being rapidly advanced upwardly, showing the holes in the inner tube being countersunk for reasons to be described.

FIG. 15 illustrates the face 22e of the latching tongue being deflected outwardly (against the spring action) as it contacts the lower portion 12'a of a hole 12a during rapid movement of the inner tube. This deflective action will continue along each of the holes 12a until the movement of the inner tube is slowed sufficiently to allow the latching tongue to penetrate one of the holes and lock the tubes together.

The holes 12c may be countersunk to create an outwardly diverging angle α, of say 60° to 90°, in addition to the use of the acute angle θ or instead thereof to provide the deflecting action.

Figure 16:
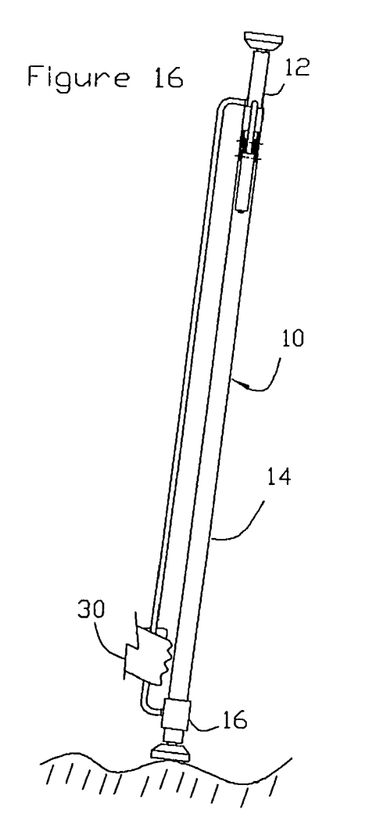
FIG. 16 is a front view of the support bar in the cocked position with a user's hand on the extension rod ready to raise the inner tube.
Figure 17:
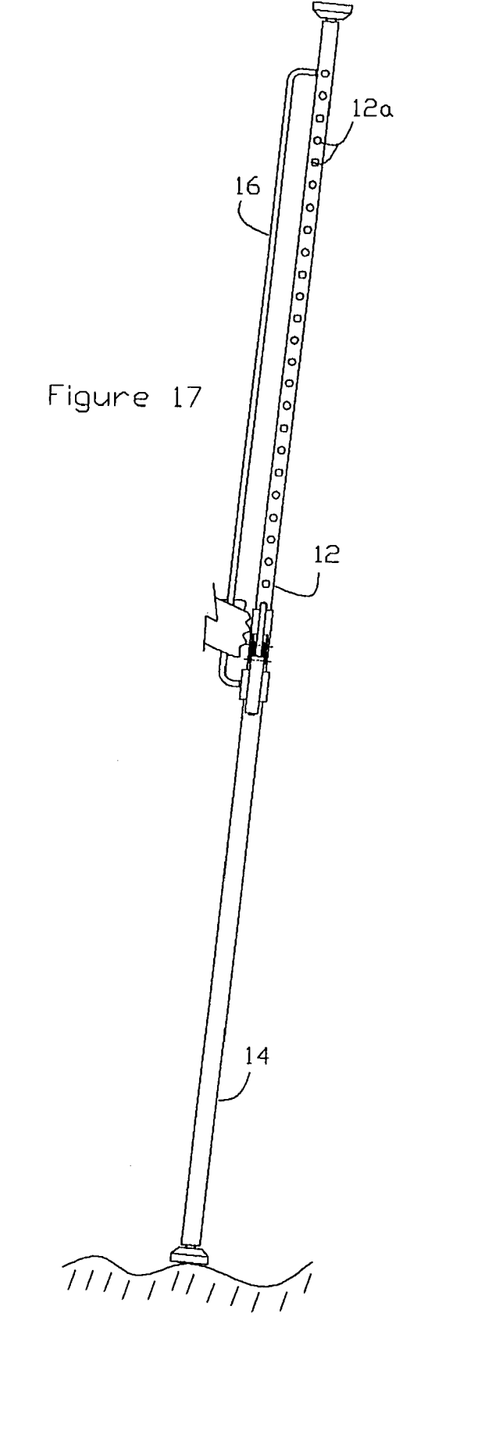
FIG. 17 is a front view of the support bar showing a user's hand still on the extension rod and the bar in an elevated position with the latching tongue engaged in one of the holes in the inner tube to lock the tubes together.

FIG. 16 shows the base of the support bar 10 sitting on the ground with the bar in its cocked position (FIG. 14) and the hand 30 of a user, such as a fire fighter, grasping the extension rod near the bottom thereof. The extension rod is then rapidly raised as is illustrated in FIG. 17 until the desired elevation of the top plate has been reached and the latching tongue seated into one of the holes 12a.

Figure 18:
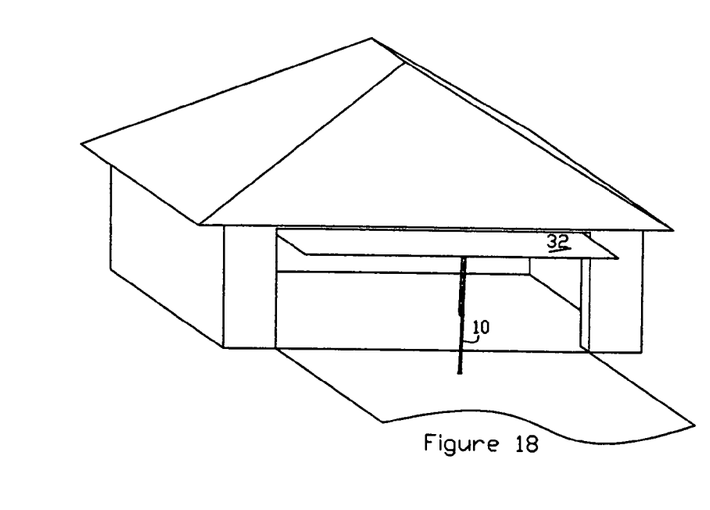
FIGS. 18, 19 and 20 are schematic illustrations showing the support bar supporting a vehicle engine compartment hood and swinging and roll up garage doors in a raised positioned, respectively.
Figure 19:
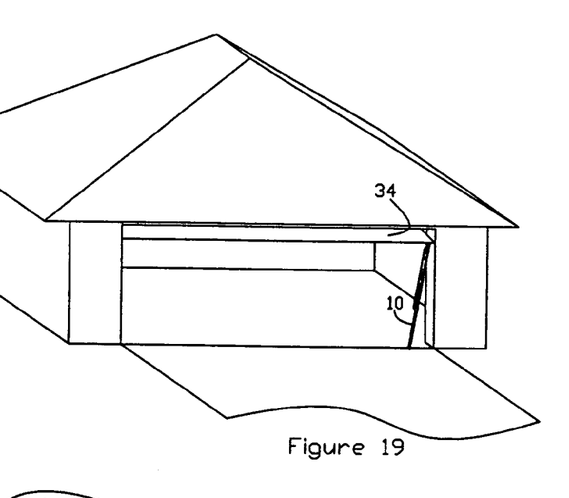
Figure 20:
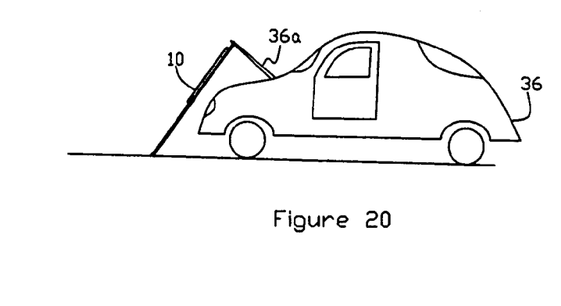

FIGS. 18 and 19 illustrate my telescopic support bar in use to elevate a swinging (32) and roll-up (34) type of garage door, respectively. FIG. 20 illustrates the use of the bar to lift and then maintain the engine compartment hood 36a of a vehicle 36 in a raised position.

As is illustrated the length of the extension rod determines the practical maximum limit of travel of the inner tube relative to the outer tube, i.e, the maximum elevation is reached when the collar 16 abuts the housing 28.

There has thus been described a novel and simple adjustable telescopic support bar for raising and or holding an object, such as a vehicle engine compartment hood, in an elevated position requiring only the use of one hand. Modifications, and perhaps improvements, will occur to those skilled in the art without involving a departure from the spirit and scope of my invention as defined in the appended claims.

What is claimed is:

1. An adjustable support bar for holding an object in an elevated position comprising:
    an elongated inner tube extending along an imaginary longitudinal axis between a lower and upper end, the upper end being adapted to support the object;
    an outer tube having a lower and upper end telescopically positioned over the inner tube so that a major portion of the inner tube is within the outer tube when the support bar is in the stored position;
    a collar slidably positioned over the outer tube;
    an elongated channel-shaped extension rod having a lower end secured to the collar and an upper end secured to the upper end of the inner tube so that the rod, except for the ends, is spaced laterally from the outer tube in the stored position to accommodate a user's hand so that the inner tube may be slidably positioned relative to the lower tube through the manipulation of the rod; and
    means for releasably locking the inner tube to the lower tube when the upper end of the inner tube has been raised to a selected elevation.

2. The invention of claim 1 wherein the inner tube includes a series of holes aligned along the longitudinal axis and wherein the locking means comprises (1) latch lever having a center section pivotally mounted adjacent the upper end of the outer tube, a distal section extending forwardly of the central section and terminating in a latching tongue arranged to extend into one of the holes in the inner tube to lock the tubes together and a manually actuable proximal section extending rearwardly of the central section for selectively disengaging the latching tongue from one of the holes, and (2) a spring coupled between the lever and the outer tube for biasing the distal section toward the inner tube.

3. The invention of claim 2 wherein the length of each of the tubes is within the range of about 3' to 6'.

4. The invention of claim 3 wherein the spacing between the hand engaging portion of the extension rod and the outer tube is within the range of about 1" to 5".

5. The invention of claim 3 further including a latch housing pivotally mounted to the outer tube, the housing extending over the proximal section of the lever in a locked protecting position and manually moveable away from the proximal section of the handle to permit the lever to be manually actuated.

6. The invention of claim 3 wherein the length of the tubes is within the range of about 4' to 5'.

7. The invention of claim 6 wherein the spacing between the rod and the outer tube is within the range of about 1¼" to 3".

8. The invention of claim 2 wherein the latching tongue has an end face which is oriented at an acute angle θ to the longitudinal axis with θ being within the range of about 3° to 5° for deflecting the latching tongue out of registry with the holes in the inner tube when the inner tube is rapidly advanced upwardly relative to the outer tube.

9. The invention of claim 8 wherein when the support bar is in its stored position the latching tongue is positioned above the uppermost hole in the inner tube.

10. The invention of claim 2 wherein the holes in the inner tube are drilled out to provide a countersunk surface for deflecting the latching tongue out of registry with the holes in the inner tube when the inner tube is rapidly advanced upwardly relative to the outer tube.

11. The invention of claim 1 wherein the length of the extension rod determines the maximum limit of travel of the inner tube relative to the lower tube.

12. An adjustable support bar for holding an object, such as a vehicle engine compartment hood, in an elevated position comprising:
   a telescoping elongated inner and outer tube assembly extending along an imaginary longitudinal axis between a lower end adapted to be placed on a support surface adapted to support the object, the inner tube having a series of spaced holes aligned parallel to the longitudinal axis;
   a collar slidably positioned over the outer tube;
   an elongated channel-shaped extension rod having a lower end secured to the collar and an upper end secured to the upper end of the inner tube so with the rod, except for the ends, being spaced laterally from the tubes to accommodate a user's hand so that the inner tube may be slidably positioned relative to the outer tube through the manipulation of the rod; and
   means mounted on the outer tube for releasably engaging one of the holes to lock the inner tube to the lower tube when the upper end of the inner tube has been raised to a selected elevation.

13. The invention of claim 12 wherein the hole engaging means comprises (1) latch lever pivotally mounted adjacent the upper end of the outer tube and extending forwardly of the pivot axis to a latching tongue arranged to extend into one of the holes in the inner tube to lock the tubes together and a handle extending rearwardly of the pivot axis, and (2) a spring coupled between the lever and the outer tube for biasing the latching tongue toward the inner tube, the handle being arranged, when manually depressed toward the outer tube, to remove the latching tongue from the hole.

14. The invention of claim 13 wherein the length of the extension rod determines the maximum elevation adjustment.

15. The invention of claim 14 further including a latch housing pivotally mounted to the outer tube, the housing extending over the lever handle in a locked protecting position and manually moveable away from the proximal section of the handle to permit the lever to be manually actuated.

16. The invention of claim 15 wherein the latching tongue has an end face which is oriented at an acute angle $\theta$ to the longitudinal axis for deflecting the latching tongue out of registry with the holes in the inner tube when the inner tube is rapidly advanced upwardly relative to the outer tube.

17. The invention of claim 16 wherein when the support bar is in its stored position the latching tongue is positioned above the uppermost hole in the inner tube.

* * * * *